Dec. 7, 1965     D. O. WURST     3,222,640
ALARM APPARATUS FOR VEHICLE OPERATOR
Filed April 2, 1962
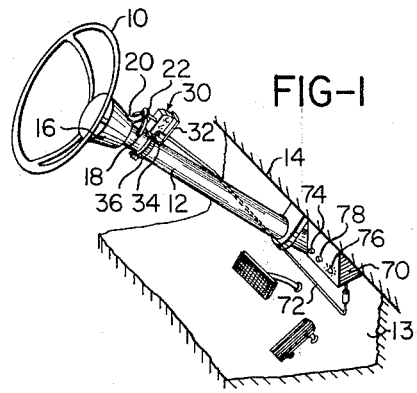
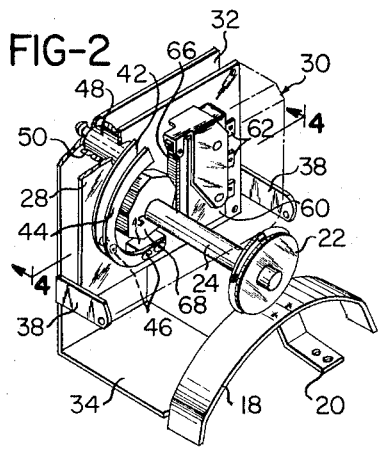
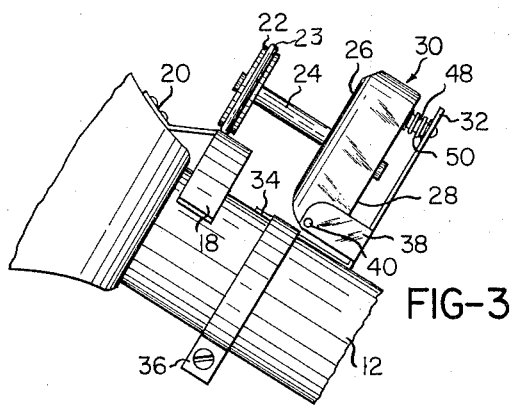
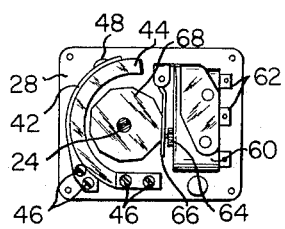
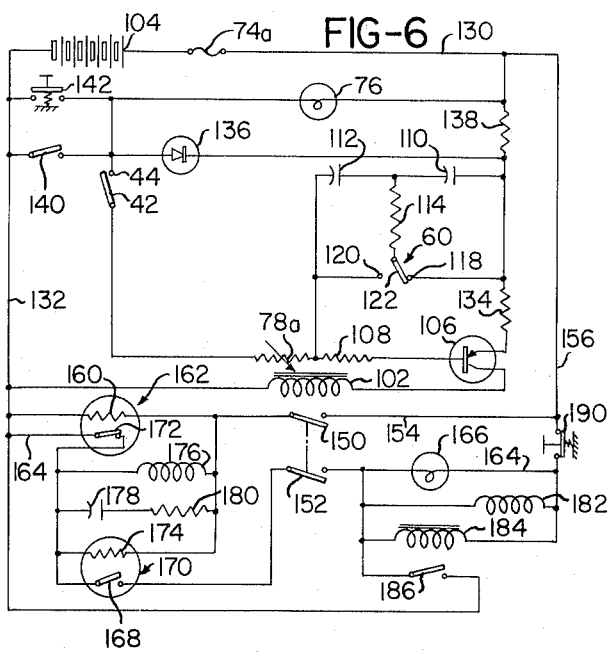
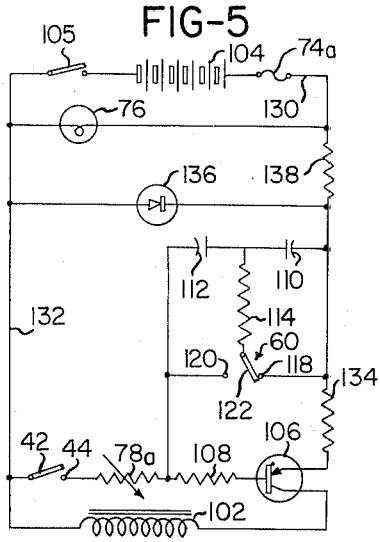
*INVENTOR.*
DONALD O. WURST
BY Dybvig and Dybvig
ATTORNEYS

United States Patent Office 3,222,640
Patented Dec. 7, 1965

3,222,640
ALARM APPARATUS FOR VEHICLE OPERATOR
Donald O. Wurst, Delphos, Ohio, assignor to Driv-A-Lert Corporation, Delphos, Ohio, a corporation of Ohio
Filed Apr. 2, 1962, Ser. No. 184,053
6 Claims. (Cl. 340—53)

This invention relates to an alarm apparatus for indicating lack of alertness of an operator of a motor vehicle.

In United States Patent No. 2,875,430, issued to Bernard J. Kayser, Jr., on February 24, 1959, an alarm apparatus is described that is designed to alert the operator of a motor vehicle should he become drowsy. The alarm apparatus described therein embodies detector means for detecting the operation of a steering mechanism within a given short interval of time, and an alarm means connected to the detector means causing an alarm if the steering mechanism does not operate within the given interval of time. The invention described therein is based upon the fact that a normally alert operator of a moving vehicle will rotate or otherwise move the steering mechanism within short intervals of time, usually approximately every two or three seconds. However, an operator of a vehicle who has become drowsy, has fallen asleep, or has become ill will fail continuously to move the steering mechanism. Accordingly, it has been found beneficial to cause an alarm to alert the driver should he become drowsy or fall asleep or to cause an alarm to alert others in the vehicle should the operator become ill.

A primary object of this invention is to provide an improved device for detecting the operation of a vehicle steering mechanism within a given short interval of time and for causing an alarm should the operator of the vehicle fail to move the steering mechanism within the given short interval of time.

In a copending application of Bernard J. Kayser, Jr., Serial No. 135,165, filed in the United States Patent Office on August 31, 1961, which application is assigned to the same assignee as the instant invention, an improved alarm apparatus is described wherein the alarm is responsive to failure of movement of the steering mechanism only during a limited range of movement thereof. Also, an electronic transistorized timing circuit is disclosed therein, the timing circuit being controlled by a relay switch which is responsive to movement of the steering wheel during the aforesaid limited range of movement. The use of a relay switch, while successful, is undesirable due to the noise caused by its operation.

A more specific object of this invention is to provide an improvement over the device described in the aforementioned copending application wherein the timing circuit is directly controlled by a switch mounted adjacent the steering mechanism without the use of a relay switch. Such a structure has been found most advantageous. Not only is the circuitry simplified, but also the distracting noise of the relay is eliminated.

A further object of this invention is to provide improved detector means of simple and rugged construction adapted to be located within a confined space on the steering post of a vehicle.

The timing circuit of this invention is so designed that the alarm will not operate unless the steering mechanism is not moved within an interval of perhaps three to five seconds. Under normal conditions, the alarm is not actuated. If the operator of a motor vehicle should become drowsy, however, he will stop moving the steering mechanism before he is deeply asleep. For this reason, alarms can be easily devised to alert the driver that he is becoming too drowsy to safely operate the vehicle. However, should the operator become ill or should he fall into such a deep sleep that an alarm would not satisfactorily arouse him, the mere actuation of an alarm would be of no benefit.

Accordingly, a further object of this invention is to provide a vehicle brake energizing or actuating means which will become operative should the operator of a vehicle fail to respond to the alarm within a given interval of time. Suitable brake actuating mechanisms are commerically available mechanisms are so designed as to gradtion of a switch or to actuation of a solenoid. The commercially available mechanisms are so designed as to gradually and evenly apply braking power to the vehicle. Tests have indicated that vehicles, even including trucks provided with semi-trailers, can be brought to a stop with commercially available brake energizing mechanisms without undue wavering or skidding of the vehicle.

A further object of the invention is to provide a timing circuit for a fatigue alarm having a longer useful life for large trucks or the like than those available in the past.

Other objects and advantages reside in the construction of parts, the combination thereof, the method of manufacture and the mode of operation, as will become more apparent from the following description.

Referring to the drawing,

FIGURE 1 is a perspective view of a portion of a motor vehicle showing an alarm apparatus made in accordance with this invention operably connected to the steering mechanism of the vehicle.

FIGURE 2 is a perspective view, with parts broken away, of a detector portion of the alarm apparatus on a somewhat larger scale than FIGURE 1.

FIGURE 3 is a side elevational view of a portion of the steering mechanism shown in FIGURE 1 and the detector portion of the alarm apparatus.

FIGURE 4 is a cross-sectional view of the detector portion of the alarm apparatus taken along lines 4—4 of FIGURE 2.

FIGURE 5 is a schematic wiring diagram of a circuit for use in the alarm apparatus made in accordance with this invention.

FIGURE 6 is a schematic wiring diagram of a modified circuit including means for actuating a brake energizing mechanism.

Referring to FIGURE 1, a steering mechanism for a motor vehicle is shown therein comprising a steering wheel 10 supported by a steering column 12. As is well known, the steering column 12 projects through a floor 13 of the vehicle underneath a panel or dashboard 14.

The steering wheel 10 is provided with a cylindrical hub 16 which rotates relative to the steering column 12. A curved control plate 18 is fixedly attached by means of a bracket 20 to the hub 16 and is adapted to rotate therewith. The curved control plate 18 is generally concentric with the axis of rotation of the hub 16 and the steering column 12, but surrounds only a limited portion thereof, being nearly semi-circular in form.

A roller 22 is in engagement with the plate 18 and rotatable thereon. If the control plate 18 is metallic, the roller 22 would preferably have an elastomeric rim, as indicated at 23. The roller 22 is attached to a drive shaft 24 journalled for rotation within aligned apertures in opposed front and back walls or plates 26 and 28 respectively of a switch housing 30. As described below, the backwall 28 serves as a support plate for a pair of switches used in detecting movement of the steering wheel 10. The switch housing 30 is mounted upon a support bracket 32 comprising a vertically oriented plate, the bottom portion 34 of the plate being bent such that it may be attached to the steering column 12 by a clamp 36. The bracket 32 further includes a pair of opposed, parallel, forwardly projecting support arms 38 to which the housing 30 is pivotally connected by means of a horizontal pivot pin 40 passing through aligned apertures in the sidewalls of the housing 30 and the support arms 38 forwardly of the backwall or support plate 28, i.e. closer to the steering wheel 10.

A pair of arcuate leaf spring contact members 42 and 44 are secured to the inner face of the backwall 28 of the housing 30 as by screws 46. The contact member 42 lies flat against the inner face of the backwall 28 while the contact 44 is mounted on an insulating block 45 so as to be generally parallel the contact 42 and in overlying relation thereto. Abutment means in the form of a pin 48 is connected at one of its ends to the member 42 and at its other end to the bracket 32 adjacent the rear of the housing 30. The entire housing 30 is normally biased in a counterclockwise direction, as viewed in FIGURE 3, about the pivot pin 40 by means of a coil spring 50 which encircles the abutment pin 48. When so biased, the spring contact members 42 and 44 are spaced one from the other. However, if the roller 22 is engaged with the control plate 18, the roller 22 and the housing 30 are pivoted in a clockwise direction as viewed in FIGURE 3. The abutment pin 48 is slidably received within an aperture in the backwall 28. Accordingly, as the housing 30 is pivoted, upon engagement of the roller 22 with the plate 18, the contact member 42 is forced by the abutment pin 48 into engagement with the spring contact member 44. As will be discussed in greater detail with relation to the circuit diagrams in FIGURES 5 and 6, the switch formed by the contact members 42 and 44 constitutes a primary on-off switch for the alarm circuit. The switch so formed is normally closed since the roller 22 will be engaged with the control plate 18 during most driving conditions. However, should the vehicle be negotiating a turn, in which case the steering wheel 10 will be rotated to a position wherein the roller 22 no longer engages the control plate 18, the spring 50 will pivot the housing 30 in a counterclockwise direction as viewed in FIGURE 3, thus opening the switch formed by the contact members 42 and 44. To reduce wear on the roller 22 and possible jamming of the roller against the plate 18, the ends of the plate 18 are turned in slightly toward its axis. The ends, therefore, serve as cams to raise or lower the roller 22 gradually as it moves therealong.

A second switch is formed within the housing 30 and serves as a timing switch for the alarm circuit as will be discussed below. The second switch may constitute a conventional micro-switch which is secured to the inner face of the backwall 28 by brackets 62 or the like. The micro-switch 60 includes the usual switch pin 64 and a pivoted switch actuating pin or leaf 66 projecting vertically downwardly from the top of the switch 60 for engagement with the pin 64. The member 66 is adapted to be engaged by a polygonal nut 68 fixedly mounted for rotation on the drive shaft 24. As apparent, rotation of the roller 22 caused by movement of the steering mechanism is imparted to the nut 68. Continued rotation of the roller 22 will cause the flat peripheral surfaces of the nut 68 and the peripheral "corners" of the nut 68 alternately to engage the member 66 repeatedly to actuate the micro-switch 60. Accordingly, the mechanism described herein will sense very small rotational movements of the steering wheel 10. In the drawings, a ten-sided nut 68 has been illustrated. This construction has proved practical in actual tests for sensing the movements of a steering wheel normally encountered under ordinary driving conditions. It will be apparent that switch engaging elements having various numbers of circumferentially spaced radial projections extending therefrom may be used in lieu of the nut 68. The number of projections adapted to engage the micro-switch 60 will depend upon the sensitivity to the rotation of the steering wheel 10 desired.

Since the switch contacts 42 and 44 are both attached to the same support plate 28 as the switch 60, the size of the switch structure may be quite small. The bracket 32, which may conveniently be a strip of lightweight sheet metal such as aluminum, can be bent to conform to the steering column as required by the available space bewteen the hub 16 of the steering mechanism and the dashboard 14. The small size of the detector means, comprising the control plate 18 and the switch mechanisms, enables use of the detector means where very little space is available.

The switches formed by the contact members 42 and 44 and the micro-switch 60 are connected to a control box 70 through a cable 72 which includes wires connected by leads to the various contact members. Thus, there is one lead connected to the contact member 42 and another lead connected to the contact member 44. Other leads are connected to the micro-switch 60. These leads are not shown in the drawing so that the structure of the contact members may be more easily understood. The leads may be insulated from the housing 30 in any suitable fashion. The control box 70 houses the remainder of the alarm circuit and includes on its front face a fuse housing 74, a signal lamp 76 and a time delay adjusting knob 78. The box 70 may conveniently be mounted on the underside of the dashboard 14. The connection of the switches described above to the remainder of the alarm circuit will now be described in reference to FIGURE 5.

In FIGURE 5, the various circuit elements described above are designated by the same reference characters. An alarm energizing relay 102 is placed in series relation with the terminals of a battery 104, which may be the usual automobile, truck or other vehicle battery. Various alarm devices may be used, such as bells or horns or suitable visual indicators of one type or another, such as a flashing light. A fuse 74a is placed in series with one terminal of the battery 104 along with an on-off switch 105 that may, if desired, be placed adjacent the control box 70. The lamp 76 is placed across the battery terminals so that when the switch 105 is closed, the lamp 76 glows to indicate that the alarm apparatus is in condition to energize the alarm should the operator fail to move the steering wheel within a given interval of time.

The alarm relay 102 is energized when sufficient current is applied thereto through a transistor 106 connected in series between the relay 102 and the battery 104. As is well known, the emitter-to-collector circuit of the transistor 106 will be conductive only when a sufficient current passes through its emitter-to-base circuit. Accordingly, the first switch described above, comprising the spring contact members 42 and 44, is placed in the base circuit of the transistor 106 in series with a base resistor 108 and a variable resistor or potentiometer 78a, the resistance of which is varied by means of the adjusting knob 78 mounted externally of the control box 70. If the contact members 42 and 44 are separated, no current can flow through the emitter-to-base circuit of the transistor 106. Accordingly, no current flows through the emitter-to-collector circuit to the alarm relay 102. Thus, unless the roller 22 is engaged with the control plate 18 and the contacts 42, 44 thereby closed, the alarm relay 102 cannot be triggered.

A timer or timing circuit comprising a pair of timing capacitors 110, 112 and a resistor 114 are placed in parallel with the emitter-to-base circuit of the transistor 106. The timing circuit is controlled by the aforedescribed switch 60, which, as shown in FIGURE 5, constitutes a single-pole, double-throw reset switch including a pair of fixed contacts 118, 120 intermittently engaged by a movable contact 122.

The operation of the circuit shown in FIGURE 5 is as follows. When the roller 22 is in engagement with the control plate 18, the switch formed by contacts 42 and 44 is closed. Assuming the movable contact 122 to be in engagement with the fixed contact 118 within the housing of the micro-switch 60, current is supplied from one terminal of the battery 104 through a conductor 130 to the resistor 114, the capacitor 112, the potentiometer 78a and a conductor 132 to the opposite terminal of the battery 104. Of course, the current is a direct current and cannot pass through the capacitor 112. However, the capacitor 112 initially provides very little resistance to the flow of current to one plate of the capacitor 112 and the flow of current away from its other plate. The resistance through the timing circuit when the contact 122 first engages the contact 118 is limited to the resistance of the potentiometer or variable resistor 78a, which is quite large, say on the order of four k-ohms. The resistance through the transistor emitter-to-base circuit includes the resistor 78a and further includes the resistance of an emitter resistor 134 and the base resistor 108. Accordingly, so long as the resistance in the time delay line is comparatively small, the flow of current through the emitter-to-base circuit of the transistor 106 is negligible. After a short interval of time, however, a charge builds upon the plates of the capacitor 112, the capacitor 112 ultimately effectively serving as an infinite resistor. As the charge on the capacitor 112 increases, the flow of current in the emitter-to-base circuit of the transistor 106 increases. Accordingly, the emitter-to-collector current will ultimately be sufficient to operate the relay 102.

Under most conditions, however, repeated movement of the steering wheel 10 causes the contact 122 to move back and forth between the fixed contacts 118 and 120 before a charge builds upon the plates of the capacitor 112 sufficient to make the emitter-to-collector circuit of the transistor become conductive. Thus, each time the steering wheel 10 is rotated by an amount sufficient to actuate the micro-switch 60, the movable switch contact 122 is moved out of engagement with the contact 118 into engagement with the contact 120, or vice versa. If the movable contact 122 were moved from the position shown in FIGURE 5, into engagement with the contact 120, the capacitor 112 would then discharge through the resistor 114. At this point, the capacitor 110 would serve as the timing element for the transistor 106. Thus, charge would increase on the plates of the capacitor 110. Again the same sequence of events occurs. That is, charge will build upon the capacitor 110 until the movable contact 122 is moved out of engagement with the contact 120.

The time in which it takes to build up a charge on one of the capacitors is dependent upon the resistance provided by the potentiometer or variable resistor 78a. By changing the resistance of the variable resistive element 78a, the given interval of time within which the alarm relay 102 will be energized for failure of the operator to move the steering mechanism of the vehicle will be changed.

From the foregoing, it is seen that circuit means are provided responsive to the detector or sensing means mounted upon the steering column 12 for energizing an alarm should the operator of the vehicle fail to move the steering mechanism within a given interval of time. The given interval of time can be varied by adjustment of the potentiometer or variable resistor 78a. The switch 60 is actuated each time the steering wheel 10 is moved by just a few degrees thereby causing one of the timing capacitors 110 or 112 to discharge and place the other previously discharged capacitor into the timing circuit in parallel with the emitter-to-base circuit of the transistor 106. That is, each time the steering wheel 10 is rotated by a few degrees, one of the timing capacitors 110 or 112 is reset to a zero time condition. Charge continues to build up on the capacitor which is placed in the timing circuit until such time as the relay 102 is energized or until the particular capacitor is discharged through the resistor 114 and is again placed in a zero time condition.

The circuit described above is quite similar to the circuit described in the aforementioned application of Bernard J. Kayser, Serial No. 135,165. However, there are two important differences. The circuit described in the aforementioned copending patent application includes a relay controlled by movement of the steering mechanism to in turn control the position of the contact 122. In accordance with this invention, the relay switch is unnecessary because the movable contact 122 forms a part of the micro-switch 60 located within the sensing or detector unit on the steering column 12. Not only is the circuit thereby simplified, but also, as mentioned above the noise associated with energization of the relay is avoided. Unless an audible alarm is actually sounded, the device is almost completely silent in operation. In addition to this change in the timing circuit, a Zener diode 136 is placed across the terminals of the battery 104 and across the timing circuit and is used in connection with a resistor 138 in the conductor 130 in a well-known fashion to regulate the voltage applied to the timing circuit. A voltage regulator has been found essential when the alarm apparatus is to be used in large trucks since it was found that the operation of the timing circuit would become erratic within a comparatively short period after installation in a truck. The primary reason for the erratic operation of the alarm apparatus in trucks appears to be caused by the wide variance in the voltage available to be supplied to the timing circuit. This has caused an erratic operation of the timing capacitors 110 and 112. In addition, the switch contacts 118 and 120 rapidly fail. However, by use of the Zener diode 136, the voltage supplied to the timing capacitors 110 and 112 is maintained at a sufficiently stable level that the timing circuit, and accordingly the alarm apparatus, will satisfactorily perform over long periods of use.

Referring now to FIGURE 6, a more elaborate circuit diagram is disclosed than that of FIGURE 5. Many of the basic circuit components are the same as those in FIGURE 5 and are identified by the same reference characters. As before, the circuit includes a relay 102 connected in series with a battery 104, the operation of the relay 102 being delayed by the timing circuit including capacitors 110 and 112 and a transistor 106.

In the circuit described in FIGURE 5, an on-off switch 105 was illustrated. The purpose of the on-off switch 105 is to enable the operator of the vehicle to disable the alarm apparatus. For example, when driving along city streets where there may be numerous stop signs or traffic lights, operation of the alarm apparatus would be undesirable while the vehicle is stopped. Normally, under such circumstances, the operator of the vehicle would not become drowsy or fall asleep. On the other hand, if the vehicle were to be driven along a limited access highway wherein few or no stops are required and on which vehicles are often driven at high speeds for long distances, drowsiness is more likely to occur. Under such circumstances the switch 105 would be closed. On the other hand, it is undesirable to permit the operator to have control of the alarm apparatus to the extent that he may disable the alarm apparatus at will. For this reason, a switch such as that indicated at 140 may be placed in series between the base resistor of the transistor 106 and the conductor 132. The switch 140 may be responsive to the speed of the vehicle in any of several known manners. For example, the switch 140 could be connected to the vehicle drive shaft. The switch 140 is designed so as to normally open at low speeds or when the vehicle is at rest, but would close after such time as the vehicle reaches a predetermined highway speed, say, for example, twenty miles per hour. While the vehicle is at rest, the operator may test the circuit by means of a normally open push button switch 142 placed in parallel with the switch 140.

Except for the substitution of the speed responsive switch 140 for the on-off switch 105 and the addition of the push button switch 42, the circuit of FIGURE 6 as thus far described is identical to that shown in FIGURE 5. In addition, FIGURE 6 shows circuit means for energizing a brake in timed relation to the operation of an alarm. The circuit includes a pair of switch elements 150 and 152 which are operated in response to energization of the relay 102. The switch element 150 is connected by a conductor 154 across the terminals of the battery 104 through a conductor 156, which is in parallel with the conductor 130, and through the conductor 132. A heater 160 for a thermal delay tube 162 is placed in the conductor so that when the switch 150 is closed, the heater 160 begins to warm up.

The switch 152 is connected by a conductor 164 across the conductors 156 and 132 in parallel to the switch 150. A brake signal lamp 166, a normally open time-delay switch 168, forming part of a thermal delay tube 170, and a normally closed time-delay switch 172, forming part of the delay tube 162, are connected in series by the conductor 164. A heater 174 for the delay tube 170 is connected across the lines 154 and 164. In addition, an inductive element 176, which actuates the alarm apparatus, and a conventional arc supressing circuit including a capacitor 178 and a resistor 180 are connected across the conductors 154 and 164 in parallel with the heater 174.

A brake actuator, which may be a solenoid, is designated by reference character 182 and is connected in parallel with the signal lamp 166. In addition, a holding relay for the brake actuating means 182, comprising an inductive member 184 in parallel with the solenoid 182 and a normally open switch 186 connected in series with the elements 182 and 184, is placed across the conductors 156 and 132.

The operation of the brake actuating circuit is as follows. If the operator of a vehicle has not moved the steering mechanism within the given interval of time required for the relay 102 to operate, the relay will operate, simultaneously closing the switches 150 and 152. Immediately, current is passed through the heaters 160 and 174, the inductive element 176 and the normally closed switch 172. Thus, the alarm is energized when the switch 150 is closed. The switch 168 is normally open. Accordingly, no current will pass through the lamp 166, the brake actuator 182, or the holding member 184 until sufficient time has elapsed for the heater 174 to cause the contacts forming the switch 168 to close.

The delay tube 170 is faster acting than the delay tube 162. Accordingly, the switch 168 will close before the switch 172 opens. When the switch 168 closes, the lamp 166, the brake operating solenoid 182 and the inductive member 184 are simultaneously placed in circuit across the terminals of the battery 104 and consequently energized. Upon energization of the latter elements, the brakes will gradually be applied by the commercially available actuating devices mentioned above and the switch 186 closes to place the solenoid 182 directly across the battery terminals. Accordingly, the brakes will continue to be applied even if the switch 168 or 172 open or should the switch 152 open due to movement of the steering mechanism. The only way the brakes can be disabled at this point is by manual operation of a push button switch 190 located in the line 156. The switch 190 is biased to be normally closed so that it can only interfere with the operation of the circuit should the brakes be applied and it is later desired to release the brakes. This is an advantageous feature. In the event the driver should become ill and incapable of further operation of the vehicle, even should he slump down against the steering wheel causing it to rotate, the brakes will continue operation. Preferably, the push button switch 190 is placed remotely from the normal position of the driver so that accidental operation of the switch 190 is avoided.

As noted above, the delay tube 170 is faster acting than the delay tube 162. The sole function of the delay tube 162 is to serve as a safety mechanism should the timing circuit function improperly. Without the delay tube 162, should the switches 150, 152 fail to open in response to movement of the steering mechanism, the brakes would be constantly applied unless the switch 190 is manually held open. The switch 172 in the delay tube 162 opens about one second after the switch 168 closes. If the switch 150 remains closed, the heater 160 remains hot and the switch 172 remains open. If the switch 190 is opened momentarily, the brakes are released and the switch 186 opened. Thereafter, the brakes cannot again operate since the switch 172 is opened. However, if the timing circuit is functioning properly, the delay tube 162 will not interfere with the operation of the brake energizing circuit. The heater 160 will cool when the switch 150 is opened in response to movement of the steering wheel, whereupon the switch 172 closes. Thus, once the brakes are energized, they can be released by opening the switch 190. Thereafter, if the apparatus is functioning properly, the circuit is automatically conditioned for further operation.

From the foregoing, it is seen that the objects of the invention have been met. The timing circuit for delaying operation of the relay 102 constitutes a simple and reliable circuit directly controlled by the movement of the steering mechanism. If desired, the more elaborate circuit of FIGURE 6 having a speed switch 140, and, if further desired, the brake energizing circuitry, may be used.

In practice, it has been found advisable to permit a delay of three to five seconds in the operation of the relay 102. This delay time may be adjusted by adjustment of the potentiometer or variable resistor 78a. The normally open delay tube 170 may be a two-second delay tube. Consequently, the brakes are applied two seconds after the alarm is sounded. This is ample time for the vehicle operator, should he be alerted, to move the steering wheel, thus opening the switches 150 and 152 and disconnecting the brake operating circuit from the battery 104. In the event the operator fails to move the steering mechanism within two seconds after the alarm is actuated, the brakes will be applied. Thereafter, movement of the steering mechanism will not release the brakes because the holding relay switch 186 places the brake operating solenoid 182 directly across the terminals of the battery 104. The brakes can only be released by manual operation of the push button switch 190.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an apparatus for maintaining alertness of an operator of steering mechanism of a motor vehicle, wherein detector means detects operation of the steering mechanism within a given interval of time and alarm means connected to the detector means causes an alarm if the steering mechanism is not operated within the given interval of time, the improvement wherein a switch support plate having an aperture therein is pivotally connected to a bracket adjacent said steering mechanism, wherein the operation of said alarm means is delayed by a timing circuit connected to an electrical energy source, said timing circuit including a timing switch mounted on said support plate, adjacent said steering mechanism, said detector means including a control plate, attached to said steering mechanism, said control plate having an arcuate surface, a rotatable shaft journalled for rotation in said aperture, a roller affixed to said shaft engaged with the arcuate surface of said control plate throughout a limited range of movement of said steering mechanism, and switch actuating means affixed to said shaft including an element having a plurality of circumferentially spaced radial projections engaging and actuating said timing switch as said shaft rotates, wherein switch means responsive to pivotal movement of said support plate is placed between said timing circuit and said energy source, said switch means including a pair of spaced spring contact members secured to said support plate, and wherein abutment means is connected to said bracket, said abutment means projecting through an aperture in said support plate adjacent one of said spring contact members, said abutment means engaging said one of said spring contact members causing it to move into engagement with the other of said spring contact members when said support plate is pivoted by engagement of said roller with said control plate.

2. The structure of claim 1 wherein vehicle brake actuating means connected to said alarm means is energized when said alarm means is energized, said brake actuating means including a brake actuating member and delay means delaying operation of said brake actuating member for a predetermined time interval after operation of said alarm.

3. The structure of claim 2 wherein said delay means comprises a thermal delay tube having a normally open switch.

4. In apparatus for maintaining alertness of an operator of steering mechanism of a motor vehicle, the steering mechanism including a steering wheel mounted for rotation relative to a steering column, the combination comprising: an electrical energy source, an electrically energized alarm, alarm actuating circuit means connected to said alarm, timing circuit means connected to said alarm actuating circuit means and delaying operation thereof, said timing circuit means including a pair of timing capacitors, a timing switch connected to said source and to said timing capacitors, said timing switch having a contact adapted to occupy a first position wherein one of said capacitors is charged by said source and a second position wherein the other of said capacitors is charged by said source, a support bracket mounted on said steering column, a housing mounted on said bracket, means mounting said timing switch on said housing, a shaft journalled for rotation in said housing and having a free end projecting outwardly therefrom, a roller affixed to said free end of said shaft in rolling engagement with a part fixed in relation to said steering wheel, switch actuator means affixed to a portion of said shaft adjacent said timing switch engaging and actuating said switch to move said contact alternately from said first position to said second position as said shaft rotates in response to rotation of said steering wheel.

5. The structure of claim 4 wherein said housing is mounted on said bracket by pivot means, wherein said part fixed in relation to said steering wheel includes a control plate having an arcuate surface engaging said roller throughout a limited range of movement of said steering wheel, said housing pivoting relative to said bracket as said roller is initially engaged with or disengaged from said arcuate surface, and wherein switch means responsive to pivotal movement of said housing is connected between said timing circuit means and said source.

6. The structure of claim 4 wherein vehicle brake actuating means connected to said source is energized when said alarm is energized, said brake actuating means including a brake actuating member and delay means delaying operation of said brake actuating member for a predetermined time interval after operation of said alarm.

References Cited by the Examiner
UNITED STATES PATENTS

| | | | |
|---|---|---|---|
| 2,625,594 | 1/1953 | Mathis | 180—82.7 |
| 2,848,712 | 8/1958 | Preston | 340—279 |
| 2,875,430 | 2/1959 | Kayser | 340—279 |
| 2,888,668 | 5/1959 | Colatriano | 340—279 |
| 3,011,040 | 11/1961 | De Remer et al. | 180—82.7 |
| 3,106,981 | 10/1963 | Chakiris | 180—82 |

NEIL C. READ, *Primary Examiner.*

THOMAS B. HABECKER, *Examiner.*

UNITED STATES PATENT OFFICE
CERTIFICATE OF CORRECTION

Patent No. 3,222,640 December 7, 1965

Donald O. Wurst

It is hereby certified that error appears in the above numbered patent requiring correction and that the said Letters Patent should read as corrected below.

Column 2, lines 8 and 9, strike out "mechanisms are so designed as to gradtion" and insert instead -- which are responsive to the operation --.

Signed and sealed this 27th day of December 1966.

(SEAL)
Attest:

ERNEST W. SWIDER
Attesting Officer

EDWARD J. BRENNER
Commissioner of Patents